United States Patent
Aronsson et al.

(10) Patent No.: US 9,129,442 B2
(45) Date of Patent: Sep. 8, 2015

(54) PRESENTING THREE DIMENSIONAL DEPTH

(75) Inventors: Pär-Anders Aronsson, Malmö (SE); Martin Ek, Lund (SE); Magnus Jendbro, Staffanstorp (SE); Magnus Landqvist, Lund (SE); Pär Stenberg, Lund (SE); Ola Thörn, Limhamn (SE)

(73) Assignees: Sony Corporation, Tokyo (JP); Sony Mobile Communicaions AB, Lund (SE)

( * ) Notice: Subject to any disclaimer, the term of this patent is extended or adjusted under 35 U.S.C. 154(b) by 533 days.

(21) Appl. No.: 13/560,466

(22) Filed: Jul. 27, 2012

(65) Prior Publication Data

US 2013/0027512 A1   Jan. 31, 2013

Related U.S. Application Data

(60) Provisional application No. 61/512,892, filed on Jul. 28, 2011.

(51) Int. Cl.
*G06T 15/50* (2011.01)
*H04N 13/02* (2006.01)

(52) U.S. Cl.
CPC ............ *G06T 15/50* (2013.01); *H04N 13/0253* (2013.01); *H04N 13/0271* (2013.01); *H04N 2213/003* (2013.01)

(58) Field of Classification Search
CPC .................................................. H04N 13/0239
USPC .......... 348/42, 43, 51, 232.1, 222.1; 382/154, 382/266, 252
See application file for complete search history.

(56) References Cited

U.S. PATENT DOCUMENTS

| | | | |
|---|---|---|---|
| 8,538,183 B1 * | 9/2013 | d'Eon et al. | 382/252 |
| 2010/0080485 A1 * | 4/2010 | Chen et al. | 382/266 |
| 2010/0283868 A1 * | 11/2010 | Clark et al. | 348/231.4 |
| 2011/0050864 A1 * | 3/2011 | Bond | 348/51 |
| 2012/0321171 A1 * | 12/2012 | Ito et al. | 382/154 |
| 2014/0198182 A1 * | 7/2014 | Ward et al. | 348/43 |

\* cited by examiner

*Primary Examiner* — Paulos M Natnael
(74) *Attorney, Agent, or Firm* — Patrick B. Horne; Moore & Van Allen PLLC

(57) ABSTRACT

An apparatus and method generate a three-dimensional image by determining, using a light-field camera, a depth map corresponding to an environment. The depth map represents how light falls in the environment. The method also includes determining a parallax occlusion map of the environment and creating, using the depth map and the parallax occlusion map, a three-dimensional image representing the environment. In some embodiments, the method includes taking a first picture of the environment with a first flash intensity and a second picture of the environment with a greater second flash, determining differences between the first picture of the environment and the second picture of the environment, determining one or more properties of the environment based at least in part on the determined differences and dynamically re-lighting the three-dimensional image using the depth map, the parallax occlusion map, and one or more of the determined properties of the environment.

21 Claims, 3 Drawing Sheets

PRESENTING THREE DIMENSIONAL DEPTH

CLAIM OF PRIORITY

This Non-provisional Patent Application claims priority to Provisional Patent Application Ser. No. 61/512,892 titled "PRESENTING THREE DIMENSIONAL DEPTH" filed on Jul. 28, 2011, assigned to the assignee hereof and hereby expressly incorporated by reference herein.

BACKGROUND

Various methods may be used for capturing and presenting three-dimensional detail in images. In one example, an accelerometer and/or gyrometer may be used to change camera view and/or light for the image. In this regard, the three-dimensional imagery may be displayed on a two-dimensional screen, for example, using technologies such as sweep panoramas, mobile device three-dimensional applications and real-depth applications.

BRIEF SUMMARY

The following presents a summary of one or more embodiments of the invention in order to provide a basic understanding of such embodiments. This summary is not an exhaustive overview of all contemplated embodiments, and is intended to neither identify key or critical elements of all embodiments, nor delineate the scope of any or all embodiments. Its sole purpose is to present some concepts of one or more embodiments in a summary form as a prelude to the more detailed description that is presented later.

According to embodiments of the invention, a method generates a three-dimensional image. The method includes determining, using a light-field camera, a depth map corresponding to an environment, the depth map representing how light falls in the environment, determining a parallax occlusion map of the environment, and creating, using the depth map and the parallax occlusion map, a three-dimensional image representing the environment. In some embodiments, the method also includes using a tilt sensor to assist in dynamically re-lighting the three-dimensional image as desired.

In some embodiments, the method also includes determining, using at least in part a light-field camera, differences between a first picture of the environment and a second picture of the environment and determining one or more properties of the environment based at least in part on the determined differences. In some such embodiments, determining differences between a first picture and a second picture includes taking a first picture of an environment, using a light-field camera, with a first flash intensity and taking a second picture of the environment, using a light-field camera, with a second flash intensity greater than the first flash intensity. In some such embodiments, the method also includes using a tilt sensor to assist in dynamically re-lighting the three-dimensional image as desired.

In some embodiments, the properties of the environment include specular properties, and in other embodiments the properties of the environment include diffusion properties. In some embodiments, the method also includes dynamically re-lighting the three-dimensional image using the depth map, the parallax occlusion map, and one or more of the determined properties of the environment.

In some embodiments, the light-field camera is disposed within a mobile device.

According to embodiments of the invention, an apparatus generates a three-dimensional image and includes a light-field camera configured for developing a depth map corresponding to an environment. The depth map represents how light falls in the environment. The apparatus also includes a processing device configured for determining a parallax occlusion map of the environment based, at least in part, on the depth map and creating, using the depth map and the parallax occlusion map, a three-dimensional image representing the environment. In some embodiments, the apparatus also includes a tilt sensor configured to assist in dynamically re-lighting the three-dimensional image as desired.

In some embodiments, the light-field camera is configured for taking a first picture of the environment with a first flash intensity and taking a second picture of the environment with a second flash intensity greater than the first flash intensity. The processing device is further configured for determining differences between the first picture of the environment and the second picture of the environment and determining one or more properties of the environment based, at least in, part on the determined differences. In some such embodiments, the apparatus also includes a tilt sensor configured to assist in dynamically re-lighting the three-dimensional image as desired. In some such embodiments, the properties of the environment comprise specular properties, and in other embodiments, the properties of the environment comprise diffusion properties. In some such embodiments, the processing device is further configured for dynamically re-lighting the three-dimensional image using the depth map, the parallax occlusion map, and one or more of the determined properties of the environment.

In some embodiments, the apparatus also includes a housing substantially enclosing the light-field camera.

According to embodiments of the invention, a computer program product includes a non-transitory computer-readable medium comprising instructions for generating a three-dimensional image. The instructions include instructions for determining, using a light-field camera, a depth map corresponding to an environment, the depth map representing how light falls in the environment. The instructions also include instructions for determining a parallax occlusion map of the environment and instructions for creating, using the depth map and the parallax occlusion map, a three-dimensional image representing the environment.

In some embodiments, the instructions also include instructions for developing a depth map corresponding to an environment. The depth map represents how light falls in the environment. The instructions also include instructions for determining a parallax occlusion map of the environment based at least in part on the depth map and instructions for creating, using the depth map and the parallax occlusion map, a three-dimensional image representing the environment. In some such embodiments, the instructions also include instructions for using a tilt sensor to assist in dynamically re-lighting the three-dimensional image as desired.

In some embodiments, the instructions also include instructions for using the light-field camera for taking a first picture of the environment with a first flash intensity, instructions for using the light-field camera for taking a second picture of the environment with a second flash intensity greater than the first flash intensity, instructions for determining differences between the first picture of the environment and the second picture of the environment, and instructions for determining one or more properties of the environment based, at least in part, on the determined differences. In some such embodiments, the instructions also include instructions for using a tilt sensor to assist in dynamically re-lighting the three-dimensional image as desired. In some such embodiments, the properties of the environment include specular properties and in other embodiments, the properties of the environment include diffusion properties. In some such embodiments, the instructions also include instructions for dynamically re-lighting the three-dimensional image using the depth map, the parallax occlusion map, and one or more of the determined properties of the environment.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
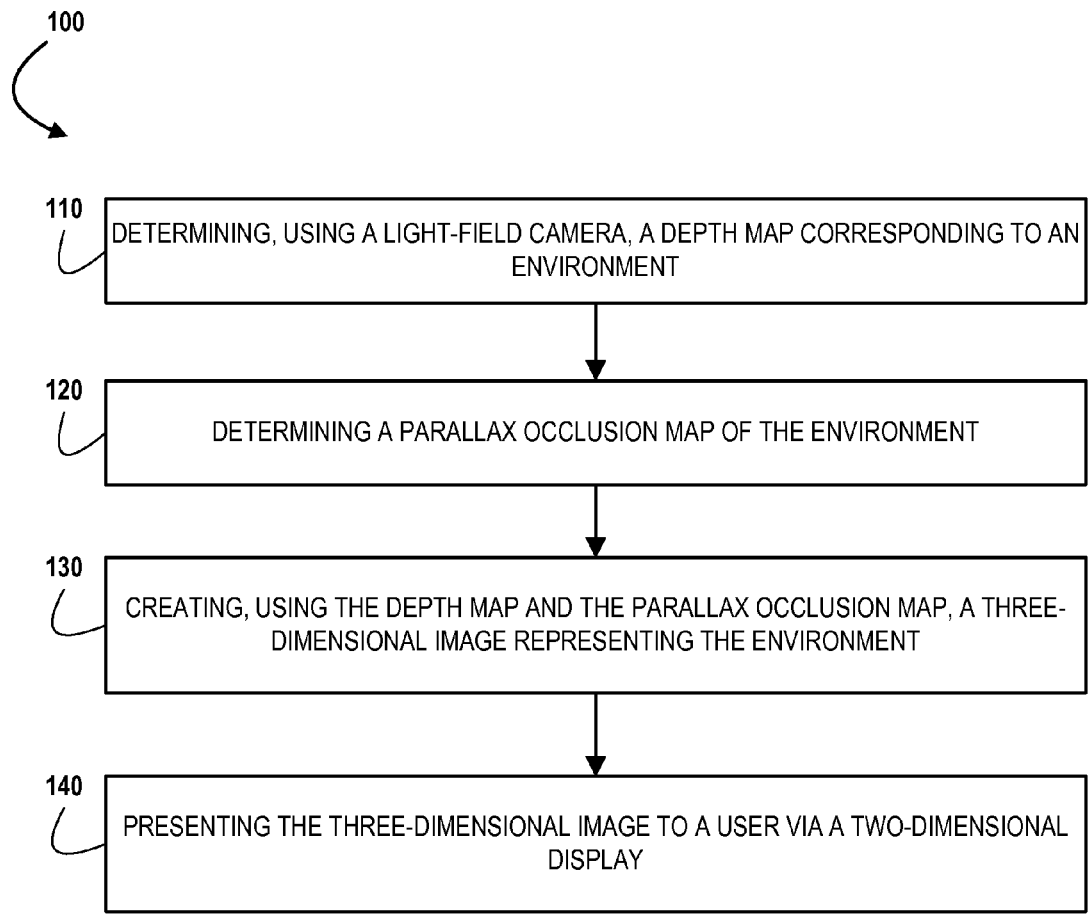
Figure 2:
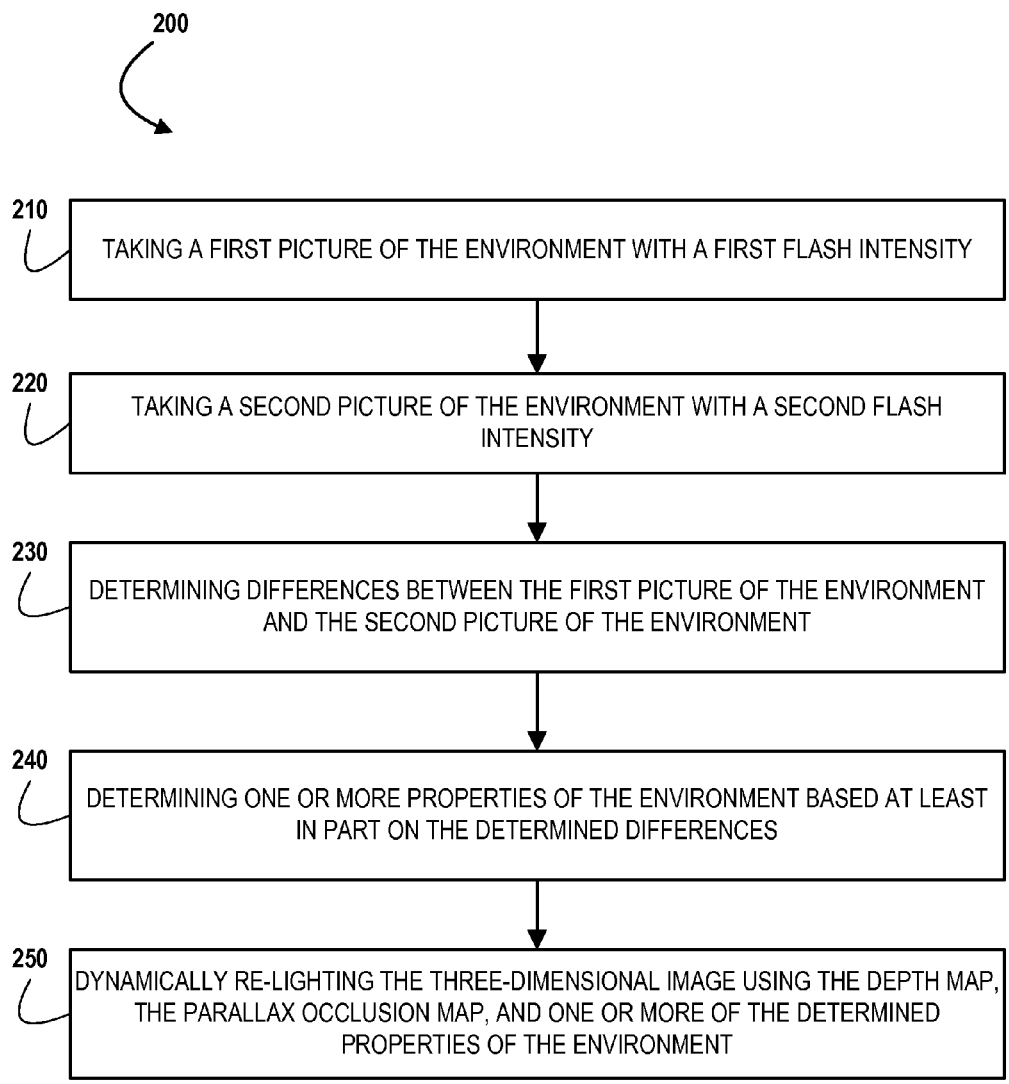
Figure 3:
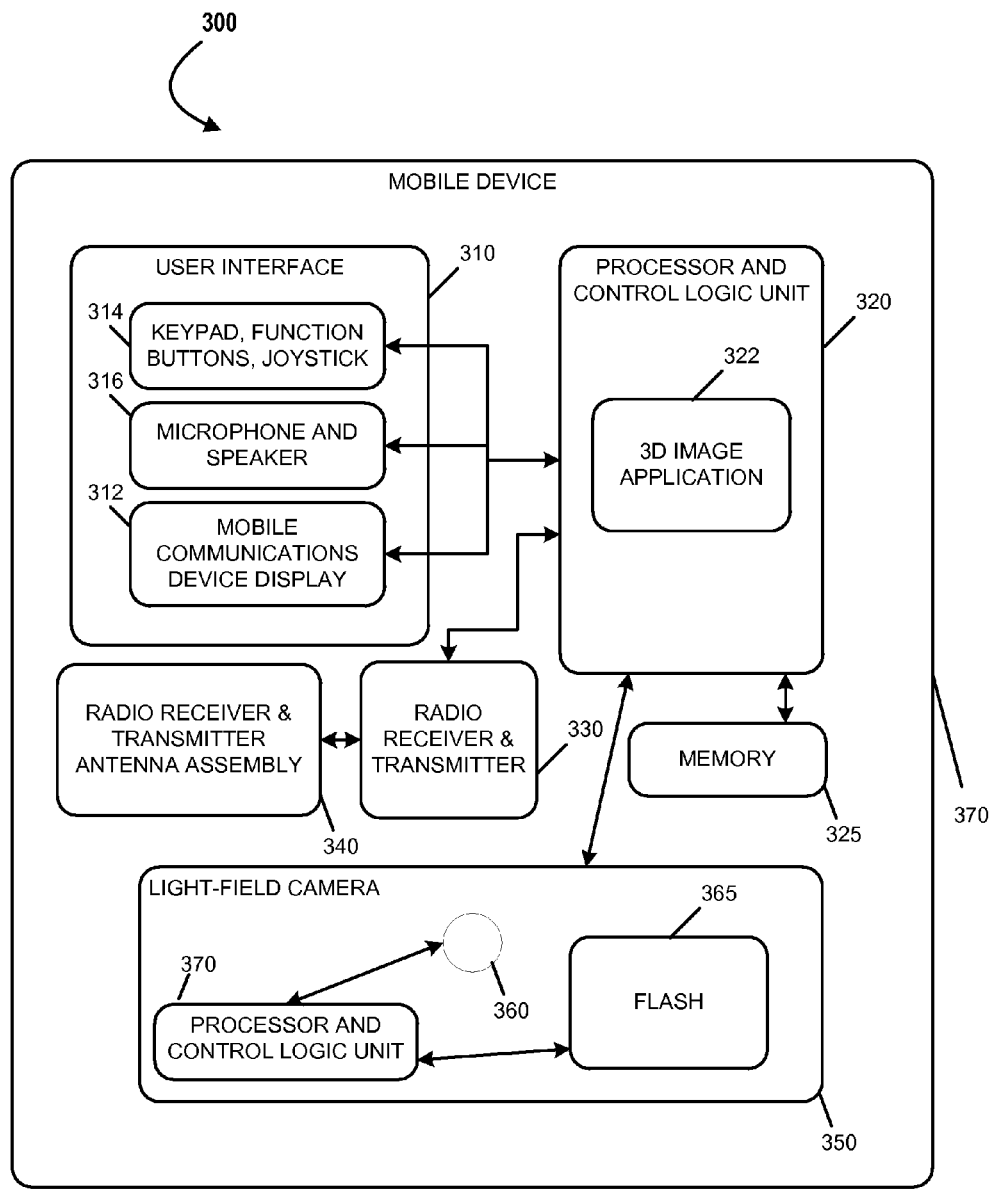

Having thus described embodiments of the invention in general terms, reference will now be made to the accompanying drawings, where:

FIG. 1 is a flowchart illustrating a general process flow for generating a three-dimensional image, in accordance with embodiments of the invention;

FIG. 2 is a flowchart illustrating another process flow for generating a three-dimensional image, in accordance with embodiments of the invention; and FIG. 3 is a block diagram illustrating components of a mobile device that houses a module for generating a three-dimensional image, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

According to embodiments of the invention, an apparatus, method and computer program product generate a three-dimensional image by determining, using a light-field camera, a depth map corresponding to an environment. The depth map represents how light falls in the environment. The method also includes determining a parallax occlusion map of the environment and creating, using the depth map and the parallax occlusion map, a three-dimensional image representing the environment. In some embodiments, the method includes taking a first picture of the environment with a first flash intensity and a second picture of the environment with a greater second flash, determining differences between the first picture of the environment and the second picture of the environment, determining one or more properties of the environment based at least in part on the determined differences and dynamically re-lighting the three-dimensional image using the depth map, the parallax occlusion map, and one or more of the determined properties of the environment.

Referring to FIG. 1, a flowchart illustrates a method 100 for generating a three-dimensional image according to embodiments of the invention. The first step, as represented by block 110, is determining a depth map corresponding to an environment. In some embodiments, a light-field camera is used to capture one or more images of the environment and then produce the depth map. A depth map, which is also referred to as a displacement map and is similar to a topography map, may be determined by a processing device and based on one or more images captured by the light-field camera.

The next step, as represented by block 120, is determining a parallax occlusion map of the environment. In some embodiments, a processing device uses the depth map to determine the parallax occlusion map of the environment. Parallax occlusion mapping is typically used to create three-dimensional definition in textured surfaces. One benefit of using parallax occlusion mapping is to avoid the necessary of generation of new geometry for the image(s). Thus, processing efficiency is increased as generation of new geometry may be very resource intensive. In this regard, programmers of video games and/or photographers of images may craft their games/subjects such that additional three-dimensional effects and/or images may be processed for three-dimensional effect without requiring additional processing power. Parallax occlusion mapping allows objects within an image to properly change relative to perspective and with self occlusion in real time, in the case of video imagery. Additionally, self shadowing and other effects are possible to create effects similar to those created using processor-intensive geometry calculations.

The next step, as represented by block 130, is creating a three-dimensional image representing the environment. In some embodiments, the three-dimensional image is created by a processing device based on the depth map and/or the parallax occlusion map. In some embodiments, the processing device also uses properties of the image(s) such as specular and/or diffusion properties determined as discussed further below using a light-field camera.

The next step, as represented by block 140, which is optional in some embodiments, is presenting the three-dimensional image to a user via a two-dimensional display. In some embodiments, the image(s) is stored in a memory of the mobile device, a memory of the light-field camera, a memory of a remote system such as a remote server and/or the like. The image(s) may be part of a series of images uses to depict an environment in an interactive three-dimensional depiction and/or may be part of a series of images stored and saved for later analysis and/or manipulation, such as manipulation of shading and the like as discussed further below.

Referring now to FIG. 2, another flowchart illustrating a method 200 for generating a three-dimensional image according to embodiments of the invention is shown.

The first step, as represented by block 210, is taking a first picture of the environment with a first flash intensity. The first picture may be taken using a light-field camera and optionally a flash. The next step, as represented by block 220, is taking a second picture of the environment with a second flash intensity that is greater than the first flash intensity. The second picture may be taken using the same light-field camera and flash or using a different light-field camera and flash. In some embodiments, the first picture may be taken with a flash intensity that is greater than the flash intensity used to take the second picture. A light-field camera is also referred to as a plenoptic camera and uses a microlens array to capture four-dimensional light field information about a scene. That is, the light-field camera captures information about the light field over a period of time.

The next step, as represented by block 230, is determining differences between the first picture of the environment and the second picture of the environment. In some embodiments, a processing device, either within the light-field camera, within the mobile device, or external to either or both, such as a processing device at a remote server, performs calculations to compare the first picture and the second picture.

The next step, as represented by block 240, is determining one or more properties of the environment based at least in part on the determined differences. In some embodiments, a processing device may determine properties regarding an image by analyzing the differences between two images taken with different light intensities. In doing so, specular properties, diffusion properties, and/or other properties of the image(s) may be determined. In some embodiments, the images compared are taken from a similar or the same perspective, thereby reducing processing needs, however, in other embodiments, two or more images may be taken from two or more perspectives, thereby potentially increasing processing needs, but in some cases, increasing the level of detail and/or resolution of the image(s). More specifically, properties regarding one or more objects within the image(s) may be determined.

Once one or more properties of the image(s) and/or the objects within the image(s) are determined, the processing device may finalize, create or otherwise generate a three-dimensional image or rendering of the environment including three-dimensional effects as discussed above with reference to block 130. The image(s) created based on the combination of parallax occlusion mapping and the properties discussed above include information regarding geometry, parallax occlusion mapping, and, in some embodiments, diffusion properties and/or specular properties of one or more of the objects within the environment. Such image(s) may be well suited for visualizing dynamically using OpenGL or another three-dimensional language.

The last step, as represented by block 250, is dynamically re-lighting the three-dimensional image using the depth map, the parallax occlusion map, and one or more of the determined properties of the environment. In some embodiments, a user or processing device performs re-lighting, re-shading or other modifications to the image(s) using the information associated with the image(s) such as the information available from the parallax occlusion mapping and/or the properties determined using the light-field camera. In some applications, a tile sensor may be used to move light and/or shadow in the image(s) and/or adjust light as desired.

These methods described herein may be applied to backgrounds, such as walls, ground planes, such as grass, roofs and the like, macro photos, and the like. In some applications, the methods described herein may be applicable to humans, such as by simulating skin in close-up photography.

Referring now to FIG. 3, a block diagram is presented illustrating a mobile device 300 that houses a module for generating a virtual three-dimensional image, in accordance with embodiments of the invention. The mobile device 300 may be a cordless telephone, cellular telephone, personal digital assistant (PDA), communicator, computer device or the like and is not unique to any particular communications standard, such as Advanced Mobile Phone Service (AMPS), Digital Advanced Mobile Phone Service (D-AMPS), Global System for Mobile Communications (GSM), Code Division Multiple Access (CDMA) or the like. In some embodiments, the mobile device 300 may not have communication capability. The design of mobile device 300 illustrated in FIG. 3 is for purposes of explaining the present invention and the present invention is not limited to any particular design.

The mobile device 300 shown in FIG. 3 may include an operator or user interface 310 to facilitate controlling operation of the mobile device including initiating and conducting phone calls and other communications. The user interface may include a display 312 to provide visual signals to a subscriber or user as to the status and operation of the mobile device 500. The display 312 may be a liquid crystal display (LCD) or the like capable of presenting color images. The display 312 may provide information to a user or operator in the form of images, text, numerals, characters, a graphical user interface (GUI) and the like. Further, the display 312, which typically includes a two-dimensional screen, may be configured to present the generated three-dimensional image or images to the user of the mobile device using the two-dimensional screen. That is, the display 312 presents the image(s), which are created to include characteristics and/or features that demonstrate three-dimensional traits but are actually confined to two dimensions themselves. Thus, the images presented are not actually presented in three dimensions, but rather, are presented appear to the user as three-dimensional images despite their display on a two dimensional screen.

The user interface 310 may also include a keypad and function keys or buttons 314 including a pointing device, such as a joystick or the like. The keypad, function buttons and joystick 314 permit the user to communicate commands to the mobile device 300 to dial phone numbers, initiate and terminate calls, establish other communications, such as access to a mobile television provider, the Internet, send and receive email, text messages and the like. The keypad, function buttons and joystick 314 may also be used to control other operations of the mobile device 310. The keypad, function buttons and joystick 314 may also be implemented on a touch sensitive display adapted to receive tactile input.

The display 312, keypad, and function buttons 314 may be coupled to a main processor and control logic unit 320, which is also referred to herein as a processing device. The processor and control logic unit 320 may be a microprocessor or the like. The processor and logic unit 320 may include a feature, such as application 322 to enable generation of three-dimensional image(s). The functions and operations described with respect to the three-dimensional image-generating module in the method of FIG. 1 may be embodied in an application 322 for generating a three-dimensional image by determining, using a light-field camera, a depth map corresponding to an environment, determining a parallax occlusion map of the environment and creating, using the depth map and the parallax occlusion map, a three-dimensional image representing the environment, initiating taking a first picture of the environment with a first flash intensity and a second picture of the environment with a greater second flash, determining differences between the first picture of the environment and the second picture of the environment, determining one or more properties of the environment based at least in part on the determined differences and dynamically re-lighting the three-dimensional image using the depth map, the parallax occlusion map, and one or more of the determined properties of the environment, etc.

The application 322 may be embodied in hardware, firmware, software (data structures) or combinations thereof. The processor and logic unit 320 may also include other data structures, software programs, computer applications and the like to encode and decode control signals; perform communication procedures and other functions as described herein. In some embodiments, the functions of the application 322 may be executed by the user via the user interface 310. In other embodiments, the functions of the application 322 may be automatically executed by the processor and the logic unit 320 upon the occurrence of one or more triggering events. In some embodiments, the application 322 is actually more than one application, and in some embodiments, the application 322 is stored in a memory, such as memory 325.

The user interface 310 may also include a microphone and a speaker 316. The microphone 316 may receive audio or acoustic signals from a user or from another acoustic source. The microphone 316 may convert the audio or acoustic signals to electrical signals. The microphone 316 may be connected to the processor and logic unit 320 where the processor and logic unit 320 may convert the electrical signals to baseband communication signals. The processor and control logic unit 320 may be connected to a radio transmitter and receiver 330 that may convert baseband signals from the processor and control logic unit 320 to radio frequency (RF) signals. The mobile radio transmitter and receiver 330 may be connected to an antenna assembly 340 for transmission of the RF signals to a communication medium or system, such as a mobile access network (voice/data) or the like.

The antenna assembly 340 may receive RF signals over the air and transfer the RF signals to mobile radio transmitter and receiver 330. The mobile radio transmitter and receiver 330 may convert the RF signals to baseband signals. The baseband signals may be applied to the processor and control logic unit 320 which may convert the baseband signals to electrical signals. The processor and control unit 320 may send the electrical signals to the speaker 316 which may convert the electrical signals to audio signals that can be understood by the user.

The block diagram of the mobile device 300 also illustrates the various components of the light-field camera 350. These components include a processor and control logic unit 370, a lens 360, and a flash 365. The block diagram does not illustrate how these components are arranged with respect to each other. The block diagram only serves to illustrate some of the various features that may be associated with the light-field camera 350 in some embodiments and is not intended as an exhaustive depiction. The light-field camera 350 may be configured or modified, via the user interface 310, by the user of the mobile device 300 or may be automatically configured or modified by the processor and logic unit 320 and/or the processor and logic unit 370 upon the occurrence of one or more trigger events.

In some embodiments, the light-field camera 350 is an add-on device configured for connecting with the mobile device 300. In such embodiments some or all the light-field camera 350 is disposed outside a housing 370 of the mobile device 300. In some embodiments, the light-field camera 350 includes several lenses and/or a microlens array, and in some embodiments, the light-field camera may or may not include a processor and control logic unit 370 and/or memory (not shown).

According to embodiments of the invention, an apparatus, method and computer program product generate a three-dimensional image by determining, using a light-field camera, a depth map corresponding to an environment. The depth map represents how light falls in the environment. The method also includes determining a parallax occlusion map of the environment and creating, using the depth map and the parallax occlusion map, a three-dimensional image representing the environment. In some embodiments, the method includes taking a first picture of the environment with a first flash intensity and a second picture of the environment with a greater second flash, determining differences between the first picture of the environment and the second picture of the environment, determining one or more properties of the environment based at least in part on the determined differences and dynamically re-lighting the three-dimensional image using the depth map, the parallax occlusion map, and one or more of the determined properties of the environment.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for generating a three-dimensional image, the method comprising:
   determining, using a light-field camera, a depth map corresponding to an environment, the depth map representing how light falls in the environment;
   determining a parallax occlusion map of the environment;
   creating, using the depth map and the parallax occlusion map, a three-dimensional image representing the environment;
   taking a first picture of an environment, using a light-field camera, with a first flash intensity;
   taking a second picture of the environment, using a light-field camera, with a second flash intensity greater than the first flash intensity;
   determining, using at least in part a light-field camera, differences between the first picture of the environment and the second picture of the environment; and
   determining one or more properties of the environment based at least in part on the determined differences.

2. The method of claim 1, further comprising:
   using a tilt sensor to assist in dynamically re-light the three-dimensional image as desired.

3. The method of claim 1, further comprising:
   using a tilt sensor to dynamically re-light the three-dimensional image as desired.

4. The method of claim 1, wherein the properties of the environment comprise specular properties.

5. The method of claim 1, wherein the properties of the environment comprise diffusion properties.

6. The method of claim 1, further comprising:
   dynamically re-lighting the three-dimensional image using the depth map, the parallax occlusion map, and one or more of the determined properties of the environment.

7. The method of claim 1, wherein the light-field camera is disposed within a mobile device.

8. An apparatus for generating a three-dimensional image, the apparatus comprising:
   a light-field camera configured for:
      developing a depth map corresponding to an environment, the depth map representing how light falls in the environment; and
   a processing device configured for:
      determining a parallax occlusion map of the environment based at least in part on the depth map;
      creating, using the depth map and the parallax occlusion map, a three-dimensional image representing the environment;
   wherein the light-field camera is further configured for:
      taking a first picture of the environment with a first flash intensity and
      taking a second picture of the environment with a second flash intensity greater than the first flash intensity; and
   wherein the processing device is further configured for:
      determining differences between the first picture of the environment and the second picture of the environment; and
      determining one or more properties of the environment based at least in part on the determined differences.

9. The apparatus of claim 8, further comprising:
   a tilt sensor configured for assisting dynamically re-lighting the three-dimensional image as desired.

10. The apparatus of claim 8, further comprising:
   a tilt sensor configured for assisting dynamically re-lighting the three-dimensional image as desired.

11. The apparatus of claim 8, wherein the properties of the environment comprise specular properties.

12. The apparatus of claim 8, wherein the properties of the environment comprise diffusion properties.

13. The apparatus of claim 8, wherein the processing device is further configured for:
   dynamically re-lighting the three-dimensional image using the depth map, the parallax occlusion map, and one or more of the determined properties of the environment.

14. The apparatus of claim 8, further comprising a housing substantially enclosing the light-field camera.

15. A computer program product comprising a non-transitory computer-readable medium comprising instructions for generating a three-dimensional image, the instructions comprising:
   instructions for determining, using a light-field camera, a depth map corresponding to an environment, the depth map representing how light falls in the environment;
   instructions for determining a parallax occlusion map of the environment;
   instructions for creating, using the depth map and the parallax occlusion map, a three-dimensional image representing the environment;
   instructions for developing a depth map corresponding to an environment, the depth map representing how light falls in the environment;
   instructions for determining a parallax occlusion map of the environment based at least in part on the depth map;
   instructions for creating, using the depth map and the parallax occlusion map, a three-dimensional image representing the environment;
   instructions for taking a first picture of the environment using the light-field camera with a first flash intensity;
   instructions for taking a second picture of the environment using the light-field camera with a second flash intensity greater than the first flash intensity;
   instructions for determining differences between the first picture of the environment and the second picture of the environment; and
   instructions for determining one or more properties of the environment based at least in part on the determined differences.

16. The computer program product of claim 15, wherein the instructions further comprise:
   instructions for using a tilt sensor to assist in dynamically re-lighting the three-dimensional image as desired.

17. The computer program product of claim 15, wherein the instructions further comprise:
   instructions for using a tilt sensor to assist in dynamically re-lighting the three-dimensional image as desired.

18. The computer program product of claim 15, wherein the properties of the environment comprise specular properties.

19. The computer program product of claim 15, wherein the properties of the environment comprise diffusion properties.

20. The computer program product of claim 15, wherein the instructions further comprise:
   instructions for dynamically re-lighting the three-dimensional image using the depth map, the parallax occlusion map, and one or more of the determined properties of the environment.

21. An apparatus for generating a three-dimensional image, the apparatus comprising:
   a light-field camera configured for:
      determining a depth map corresponding to an environment, the depth map representing how light falls in the environment; and
   a processing device configured for:
      determining a parallax occlusion map of the environment; and
      creating, using the depth map and the parallax occlusion map, a three-dimensional image representing the environment;
   wherein the light-field camera is further configured for:
      determining differences between a first picture of the environment and a second picture of the environment;
   wherein the processing device is further configured for:
      determining one or more properties of the environment based at least in part on the determined differences; and
      dynamically re-lighting the three-dimensional image using the depth map, the parallax occlusion map, and one or more of the determined properties of the environment.

* * * * *

UNITED STATES PATENT AND TRADEMARK OFFICE
CERTIFICATE OF CORRECTION

| | | |
|---|---|---|
| PATENT NO. | : 9,129,442 B2 | Page 1 of 1 |
| APPLICATION NO. | : 13/560466 | |
| DATED | : September 8, 2015 | |
| INVENTOR(S) | : Pär-Anders Aronsson et al. | |

It is certified that error appears in the above-identified patent and that said Letters Patent is hereby corrected as shown below:

In the claims

Column 10, Line 26, Claim 2, replace "re-light" with "re-lighting".

Signed and Sealed this
Second Day of February, 2016

Michelle K. Lee
*Director of the United States Patent and Trademark Office*